US012360824B2

(12) United States Patent
Pawlowski et al.

(10) Patent No.: US 12,360,824 B2
(45) Date of Patent: Jul. 15, 2025

(54) RETURN VALUE STORAGE FOR ATOMIC FUNCTIONS

(71) Applicant: Intel Corporation, Santa Clara, CA (US)

(72) Inventors: Robert Pawlowski, Beaverton, OR (US); Fabio Checconi, Santa Clara, CA (US); Fabrizio Petrini, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 764 days.

(21) Appl. No.: 17/485,102

(22) Filed: Sep. 24, 2021

(65) Prior Publication Data

US 2023/0095207 A1    Mar. 30, 2023

(51) Int. Cl.
  *G06F 13/28*    (2006.01)
  *G06F 9/52*    (2006.01)
(52) U.S. Cl.
  CPC ............... *G06F 9/52* (2013.01); *G06F 13/28* (2013.01)

(58) Field of Classification Search
  None
  See application file for complete search history.

(56) References Cited

U.S. PATENT DOCUMENTS 11,474,961 B2 * 10/2022 Master ............... H04L 63/123
2015/0212759 A1 * 7/2015 Jo ..................... G06F 3/0679
                                                                710/24

* cited by examiner

*Primary Examiner* — Michael Sun
(74) *Attorney, Agent, or Firm* — Fletcher Yoder, P.C.

(57) ABSTRACT

A memory architecture may provide support for any number of direct memory access (DMA) operations at least partially independent of the CPU coupled to the memory. DMA operations may involve data movement between two or more memory locations and may involve minor computations. At least some DMA operations may include any number of atomic functions, and at least some of the atomic functions may include a corresponding return value. A system includes a first direct memory access (DMA) engine to request a DMA operation. The DMA operation includes an atomic operation. The system also includes a second DMA engine to receive a return value associated with the atomic operation and store the return value at a source memory.

20 Claims, 12 Drawing Sheets

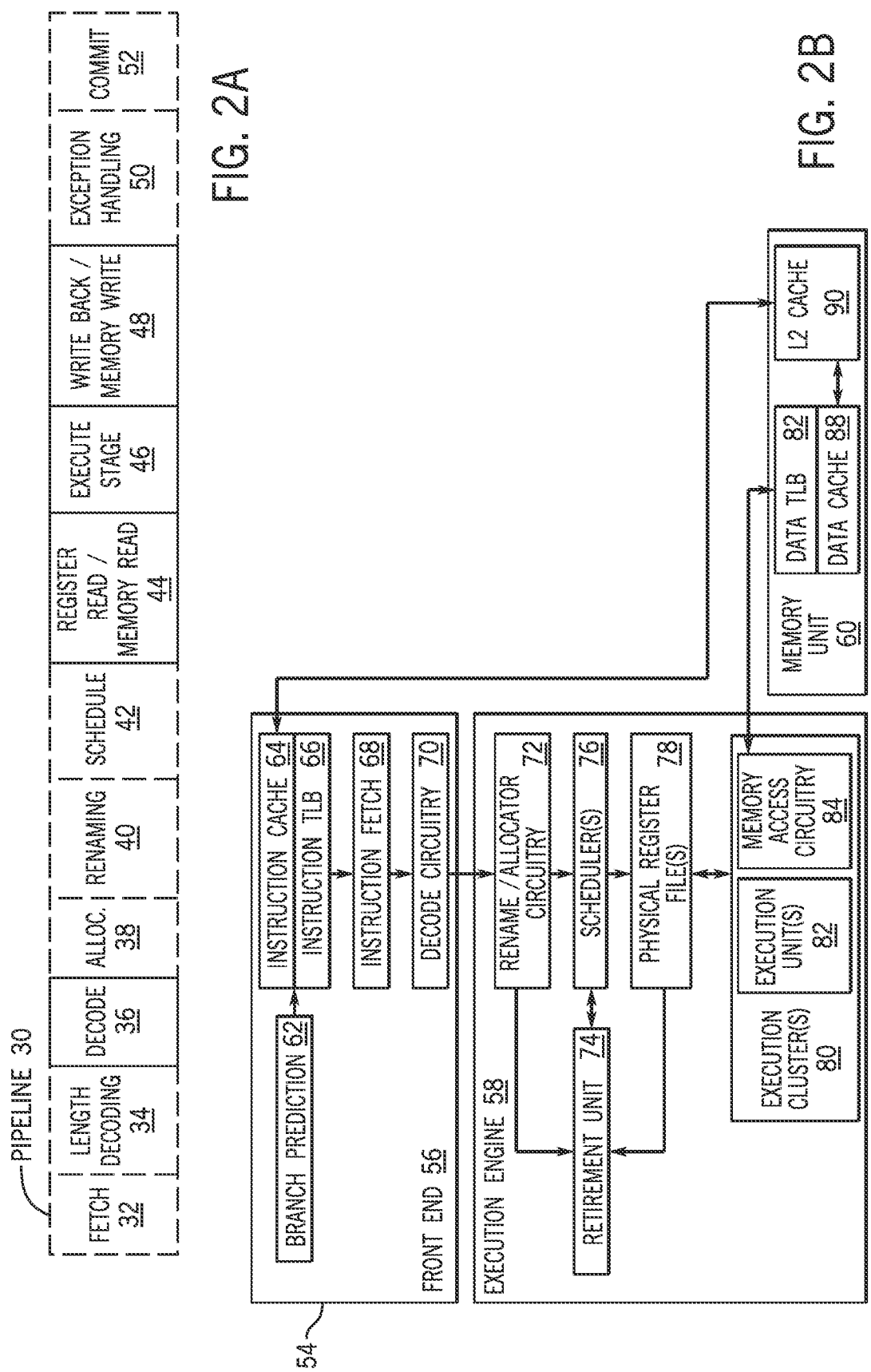

RETURN VALUE STORAGE FOR ATOMIC FUNCTIONS

STATEMENT REGARDING FEDERALLY SPONSORED RESEARCH OR DEVELOPMENT

This invention was made with Government support under Agreement No. HR0011-17-3-0004, awarded by DARPA. The Government has certain rights in the invention.

BACKGROUND

The present disclosure relates generally to return value storage for atomic functions. More particularly, the present disclosure relates to return value storage for atomic functions during direct memory access operations.

Parallel algorithms may typically perform atomic function during direct memory access (DMA) operations. In some instances, a return value of an atomic function may be needed for synchronization and/or coordination between execution threads. However, existing memory architecture may not support return values from atomic functions and additional computation time and algorithm configuration may be necessary to retrieve return value data previously held in memory before execution of DMA operations.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

BRIEF DESCRIPTION OF THE DRAWINGS

Various aspects of this disclosure may be better understood upon reading the following detailed description and upon reference to the drawings in which:

FIG. 2A is a block diagram illustrating an in-order pipeline and a register renaming, out-of-order issue/execution pipeline, in accordance with an embodiment of the present disclosure;

FIG. 2B is a block diagram illustrating an in-order architecture core and a register renaming, out-of-order issue/execution architecture core to be included in a processor, in accordance with an embodiment of the present disclosure;

DETAILED DESCRIPTION OF THE EMBODIMENTS

One or more specific embodiments will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Register Architecture

Figure 1:
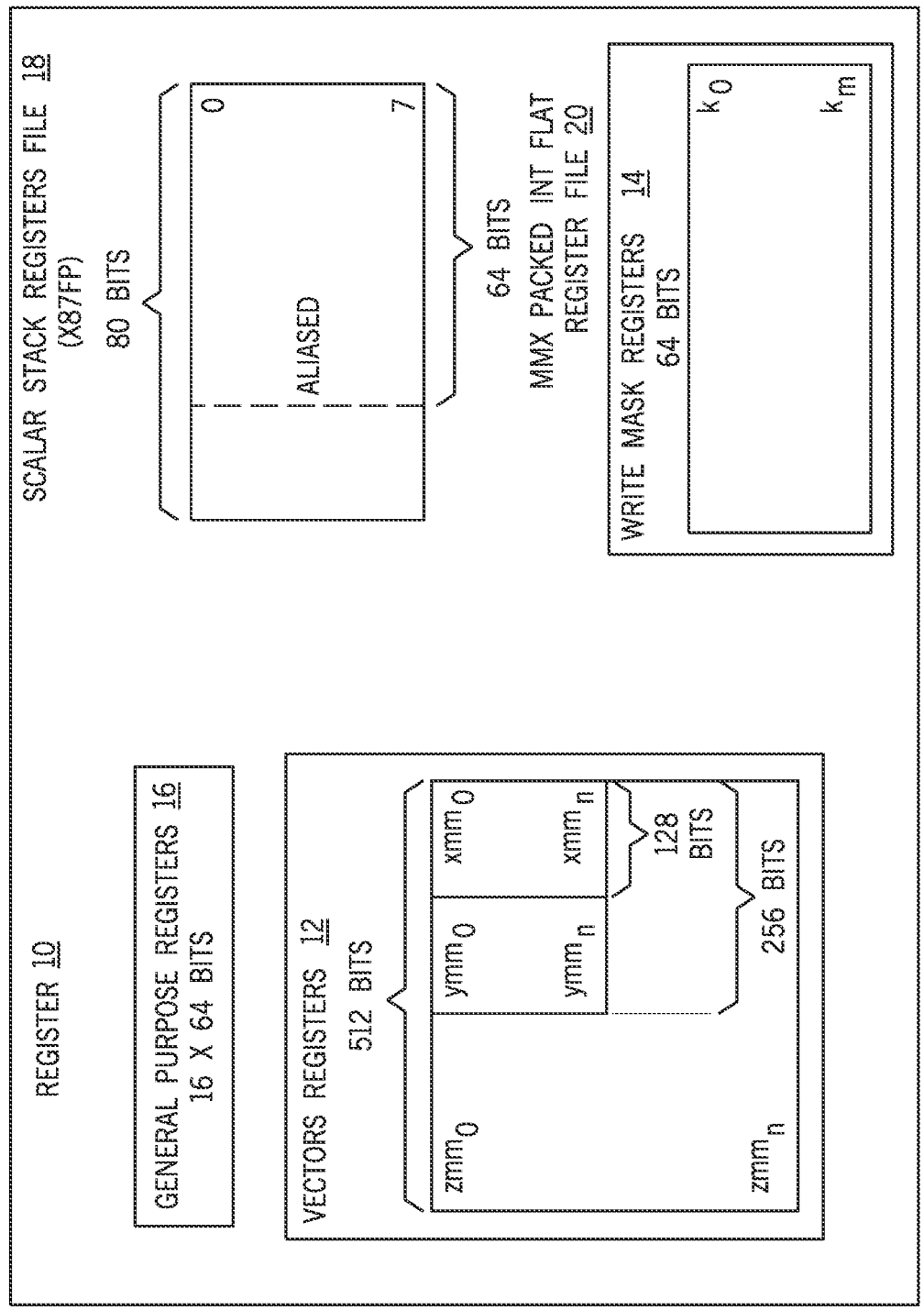
FIG. 1 is a block diagram of a register architecture, in accordance with an embodiment of the present disclosure.

FIG. 1 is a block diagram of a register architecture 10, in accordance with an embodiment of the present disclosure. In the embodiment illustrated, there are a number (e.g., 32) of vector registers 12 that may be a number (e.g., 512) of bits wide. In the register architecture 10; these registers are referenced as zmm0 through $zmm_i$. The lower order (e.g., 256) bits of the lower n (e.g., 16) zmm registers are overlaid on corresponding registers ymm. The lower order (e.g., 128 bits) of the lower n zmm registers that are also the lower order n bits of the ymm registers are overlaid on corresponding registers xmm.

Write mask registers 14 may include m (e.g., 8) write mask registers (k0 through km), each having a number (e.g., 64) of bits. Additionally or alternatively, at least some of the write mask registers 14 may have a different size (e.g., 16 bits). At least some of the vector mask registers 12 (e.g., k0) are prohibited from being used as a write mask. When such vector mask registers are indicated, a hardwired write mask (e.g., 0xFFFF) is selected and, effectively disabling write masking for that instruction.

General-purpose registers 16 may include a number (e.g., 16) of registers having corresponding bit sizes (e.g., 64) that are used along with x86 addressing modes to address memory operands. These registers may be referenced by the names RAX, RBX, RCX, RDX, RBP, RSI, RDI, RSP, and R8 through R15. Parts (e.g., 32 bits of the registers) of at least some of these registers may be used for modes (e.g., 32-bit mode) that is shorter than the complete length of the registers.

Scalar floating-point stack register file (x87 stack) 18 has an MMX packed integer flat register file 20 is aliased. The x87 stack 18 is an eight-element (or other number of elements) stack used to perform scalar floating-point operations on floating point data using the x87 instruction set extension. The floating-point data may have various levels of precision (e.g., 16, 32, 64, 80, or more bits). The MMX packed integer flat register files 20 are used to perform operations on 64-bit packed integer data, as well as to hold operands for some operations performed between the MMX packed integer flat register files 20 and the XMM registers.

Alternative embodiments may use wider or narrower registers. Additionally, alternative embodiments may use more, less, or different register files and registers.

Core Architectures, Processors, and Computer Architectures

Processor cores may be implemented in different ways, for different purposes, and in different processors. For instance, implementations of such cores may include: 1) a general purpose in-order core suitable for general-purpose computing; 2) a high performance general purpose out-of-order core suitable for general-purpose computing; 3) a special purpose core suitable for primarily for graphics and/or scientific (throughput) computing. Implementations of different processors may include: 1) a CPU including one or more general purpose in-order cores suitable for general-purpose computing and/or one or more general purpose out-of-order cores suitable for general-purpose computing; and 2) a coprocessor including one or more special purpose cores primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

In-Order and Out-of-Order Core Architecture

FIG. 2A is a block diagram illustrating an in-order pipeline and a register renaming, out-of-order issue/execution pipeline according to an embodiment of the disclosure. FIG. 2B is a block diagram illustrating both an embodiment of an in-order architecture core and an exemplary register renaming, out-of-order issue/execution architecture core to be included in a processor according to embodiments. The solid lined boxes in FIGS. 2A and 2B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 2A, a pipeline 30 in the processor includes a fetch stage 32, a length decode stage 34, a decode stage 36, an allocation stage 38, a renaming stage 40, a scheduling (also known as a dispatch or issue) stage 42, a register read/memory read stage 44, an execute stage 46, a write back/memory write stage 48, an exception handling stage 50, and a commit stage 52.

FIG. 2B shows a processor core 54 including a front-end unit 56 coupled to an execution engine unit 58, and both are coupled to a memory unit 60. The processor core 54 may be a reduced instruction set computing (RISC) core, a complex instruction set computing (CISC) core, a very long instruction word (VLIW) core, or other core types. As yet another option, the processor core 54 may be a special-purpose core, such as, for example, a network or communication core, compression engine, coprocessor core, general purpose computing graphics processing unit (GPGPU) core, graphics core, or the like.

The front-end unit 56 includes a branch prediction unit 62 coupled to an instruction cache unit 64 that is coupled to an instruction translation lookaside buffer (TLB) 66. The TLB 66 is coupled to an instruction fetch unit 68. The instruction fetch unit 68 is coupled to a decode circuitry 70. The decode circuitry 70 (or decoder) may decode instructions and generate as an output one or more micro-operations, micro-code entry points, microinstructions, other instructions, or other control signals, which are decoded from, or which otherwise reflect, or are derived from, the original instructions. The decode circuitry 70 may be implemented using various different mechanisms. Examples of suitable mechanisms include, but are not limited to, look-up tables, hardware implementations, programmable logic arrays (PLAs), microcode read only memories (ROMs), etc. The processor core 54 may include a microcode ROM or other medium that stores microcode for macroinstructions (e.g., in decode circuitry 70 or otherwise within the front-end unit 56). The decode circuitry 70 is coupled to a rename/allocator unit 72 in the execution engine unit 58.

The execution engine unit 58 includes a rename/allocator unit 72 coupled to a retirement unit 74 and a set of one or more scheduler unit(s) 76. The scheduler unit(s) 76 represents any number of different schedulers, including reservations stations, central instruction window, etc. The scheduler unit(s) 76 is coupled to physical register file(s) unit(s) 78. Each of the physical register file(s) unit(s) 78 represents one or more physical register files storing one or more different data types, such as scalar integers, scalar floating points, packed integers, packed floating points, vector integers, vector floating points, statuses (e.g., an instruction pointer that is the address of the next instruction to be executed), etc. In one embodiment, the physical register file(s) unit(s) 78 includes the vector registers 12, the write mask registers 14, and/or the x87 stack 18. These register units may provide architectural vector registers, vector mask registers, and general-purpose registers. The physical register file(s) unit(s) 78 is overlapped by the retirement unit 74 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.).

The retirement unit 74 and the physical register file(s) unit(s) 78 are coupled to an execution cluster(s) 80. The execution cluster(s) 80 includes a set of one or more execution units 82 and a set of one or more memory access circuitries 84. The execution units 82 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform multiple different functions. The scheduler unit(s) 76, physical register file(s) unit(s) 78, and execution cluster(s) 80 are shown as being singular or plural because some processor cores 54 create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster. In the case of a separate memory access pipeline, a processor core 54 for the separate memory access pipeline is the only the execution cluster 80 that has the memory access circuitry 84). It should also be understood that where separate pipelines are used, one or more of these pipelines may be out-of-order issue/execution and the rest perform in-order execution.

The set of memory access circuitry 84 is coupled to the memory unit 60. The memory unit 60 includes a data TLB unit 86 coupled to a data cache unit 88 coupled to a level 2 (L2) cache unit 90. The memory access circuitry 84 may include a load unit, a store address unit, and a store data unit, each of which is coupled to the data TLB unit 86 in the memory unit 60. The instruction cache unit 64 is further coupled to the level 2 (L2) cache unit 90 in the memory unit 60. The L2 cache unit 90 is coupled to one or more other levels of caches and/or to a main memory.

By way of example, the register renaming, out-of-order issue/execution core architecture may implement the pipeline 30 as follows: 1) the instruction fetch unit 68 performs the fetch and length decoding stages 32 and 34 of the pipeline 30; 2) the decode circuitry 70 performs the decode stage 36 of the pipeline 30; 3) the rename/allocator unit 72 performs the allocation stage 38 and renaming stage 40 of the pipeline; 4) the scheduler unit(s) 76 performs the schedule stage 42 of the pipeline 30; 5) the physical register file(s) unit(s) 78 and the memory unit 60 perform the register read/memory read stage 44 of the pipeline 30; the execution cluster 80 performs the execute stage 46 of the pipeline 30; 6) the memory unit 60 and the physical register file(s) unit(s) 78 perform the write back/memory write stage 48 of the pipeline 30; 7) various units may be involved in the exception handling stage 50 of the pipeline; and/or 8) the retirement unit 74 and the physical register file(s) unit(s) 78 perform the commit stage 52 of the pipeline 30.

The processor core 54 may support one or more instructions sets, such as an x86 instruction set (with or without additional extensions for newer versions); a MIPS instruction set of MIPS Technologies of Sunnyvale, CA; an ARM instruction set (with optional additional extensions such as NEON) of ARM Holdings of Sunnyvale, CA). Additionally or alternatively, the processor core 54 includes logic to support a packed data instruction set extension (e.g., AVX1, AVX2), thereby allowing the operations used by multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof, such as a time-sliced fetching and decoding and simultaneous multithreading in INTEL® Hyperthreading technology.

While register renaming is described in the context of out-of-order execution, register renaming may be used in an in-order architecture. While the illustrated embodiment of the processor also includes a separate instruction cache unit 64, a separate data cache unit 88, and a shared L2 cache unit 90, some processors may have a single internal cache for both instructions and data, such as, for example, a Level 1 (L1) internal cache, or multiple levels of the internal cache. In some embodiments, the processor may include a combination of an internal cache and an external cache that is external to the processor core 54 and/or the processor. Alternatively, some processors may use a cache that is external to the processor core 54 and/or the processor.

Figure 3B:
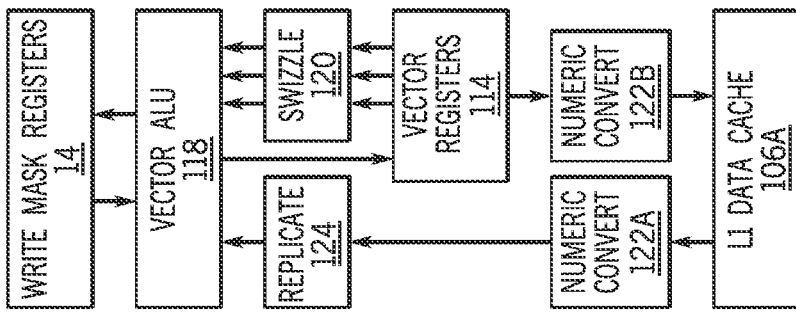
FIGS. 3A and 3B illustrate a block diagram of a more specific exemplary in-order core architecture, which core would be one of several logic blocks (including other cores of the same type and/or different types) in a chip, in accordance with an embodiment of the present disclosure.
Figure 3A:
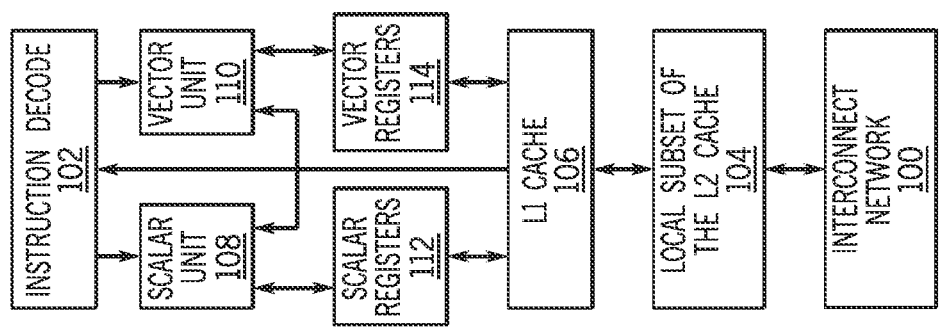

FIGS. 3A and 3B illustrate more detailed block diagrams of an in-order core architecture. The processor core 54 includes one or more logic blocks (including other cores of the same type and/or different types) in a chip. The logic blocks communicate through a high-bandwidth interconnect network (e.g., a ring network) with some fixed function logic, memory I/O interfaces, and other I/O logic, depending on the application.

FIG. 3A is a block diagram of a single processor core 54, along with its connection to an on-die interconnect network 100 and with its local subset of the Level 2 (L2) cache 104, according to embodiments of the disclosure. In one embodiment, an instruction decoder 102 supports the x86 instruction set with a packed data instruction set extension. An L1 cache 106 allows low-latency accesses to cache memory into the scalar and vector units. While in one embodiment (to simplify the design), a scalar unit 108 and a vector unit 110 use separate register sets (respectively, scalar registers 112 (e.g., x87 stack 18) and vector registers 114 (e.g., vector registers 12) and data transferred between them is written to memory and then read back in from a level 1 (L1) cache 106, alternative embodiments of the disclosure may use a different approach (e.g., use a single register set or include a communication path that allow data to be transferred between the two register files without being written and read back).

The local subset of the L2 cache 104 is part of a global L2 cache unit 90 that is divided into separate local subsets, one per processor core. Each processor core 54 has a direct access path to its own local subset of the L2 cache 104. Data read by a processor core 54 is stored in its L2 cache 104 subset and can be accessed quickly, in parallel with other processor cores 54 accessing their own local L2 cache subsets. Data written by a processor core 54 is stored in its own L2 cache 104 subset and is flushed from other subsets, if necessary. The interconnection network 100 ensures coherency for shared data. The interconnection network 100 is bi-directional to allow agents such as processor cores, L2 caches, and other logic blocks to communicate with each other within the chip. Each data-path may have a number (e.g., 1012) of bits in width per direction.

FIG. 3B is an expanded view of part of the processor core in FIG. 3A according to embodiments of the disclosure. FIG. 3B includes an L1 data cache 106A part of the L1 cache 106, as well as more detail regarding the vector unit 110 and the vector registers 114. Specifically, the vector unit 110 may be a vector processing unit (VPU) (e.g., a vector arithmetic logic unit (ALU) 118) that executes one or more of integer, single-precision float, and double-precision float instructions. The VPU supports swizzling the register inputs with swizzle unit 120, numeric conversion with numeric convert units 122A and 122B, and replication with replication unit 124 on the memory input. The write mask registers 14 allow predicating resulting vector writes.

Figure 4:
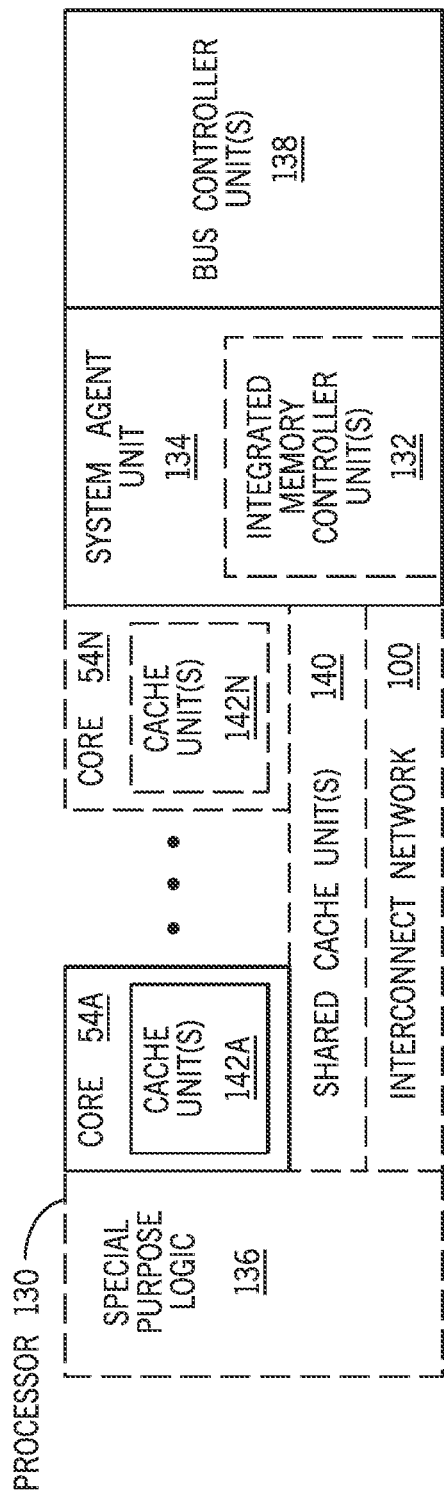
FIG. 4 is a block diagram of a processor that may have more than one core, may have an integrated memory controller, and may have integrated graphics, in accordance with an embodiment of the present disclosure.

FIG. 4 is a block diagram of a processor 130 that may have more than one processor core 54, may have an integrated memory controller unit(s) 132, and may have integrated graphics according to embodiments of the disclosure. The solid lined boxes in FIG. 4 illustrate a processor 130 with a single core 54A, a system agent unit 134, a set of one or more bus controller unit(s) 138, while the optional addition of the dashed lined boxes illustrates the processor 130 with multiple cores 54A-N, a set of one or more integrated memory controller unit(s) 132 in the system agent unit 134, and a special purpose logic 136.

Thus, different implementations of the processor 130 may include: 1) a CPU with the special purpose logic 136 being integrated graphics and/or scientific (throughput) logic (which may include one or more cores), and the cores 54A-N being one or more general purpose cores (e.g., general purpose in-order cores, general purpose out-of-order cores, or a combination thereof); 2) a coprocessor with the cores 54A-N being a relatively large number of special purpose cores intended primarily for graphics and/or scientific (throughput); and 3) a coprocessor with the cores 54A-N being a relatively large number of general purpose in-order cores. Thus, the processor 130 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), an embedded processor, or the like. The processor 130 may be implemented on one or more chips. The processor 130 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 140, and external memory (not shown) coupled to the set of integrated memory controller unit(s) 132. The set of shared cache units 140 may include one or more mid-level caches, such as level 2 (L2), level 3 (L3), level 4 (L4), or other levels of cache, a last level cache (LLC), and/or combinations thereof. While a ring-based interconnect network 100 may interconnect the integrated graphics logic 136 (integrated graphics logic 136 is an example of and is also referred to herein as special purpose logic 136), the set of shared cache units 140, and/or the system agent unit 134/ integrated memory controller unit(s) 132 may use any number of known techniques for interconnecting such units. For example, coherency may be maintained between one or more cache units 142A-N and cores 54A-N.

In some embodiments, one or more of the cores 54A-N are capable of multi-threading. The system agent unit 134 includes those components coordinating and operating cores 54A-N. The system agent unit 134 may include, for example, a power control unit (PCU) and a display unit. The PCU may be or may include logic and components used to regulate the power state of the cores 54A-N and the integrated graphics logic 136. The display unit is used to drive one or more externally connected displays.

The cores 54A-N may be homogenous or heterogeneous in terms of architecture instruction set. That is, two or more of the cores 54A-N may be capable of execution of the same instruction set, while others may be capable of executing only a subset of a single instruction set or a different instruction set.

Computer Architecture

FIGS. 5-8 are block diagrams of embodiments of computer architectures. These architectures may be suitable for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices. In general, a wide variety of systems or electronic devices capable of incorporating the processor 130 and/or other execution logic.

Figure 5:
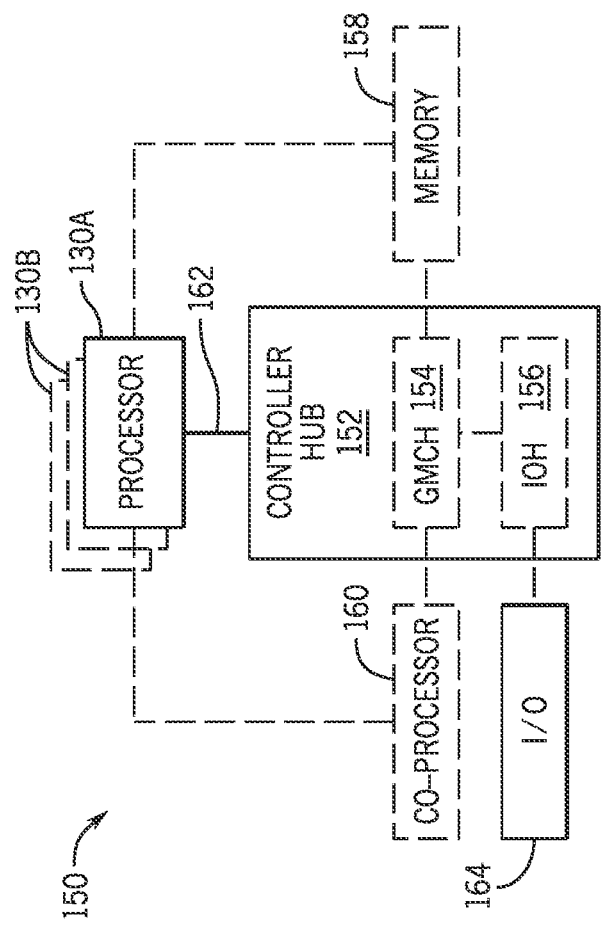
FIG. 5 shown a block diagram of a system, in accordance with an embodiment of the present disclosure.

Referring now to FIG. 5, shown is a block diagram of a system 150 in accordance with an embodiment of the present disclosure. The system 150 may include one or more processors 130A, 130B that is coupled to a controller hub 152. The controller hub 152 may include a graphics memory controller hub (GMCH) 154 and an Input/Output Hub (IOH) 156 (which may be on separate chips); the GMCH 154 includes memory and graphics controllers to which are coupled memory 158 and a coprocessor 160; the IOH 156 couples input/output (I/O) devices 164 to the GMCH 154. Alternatively, one or both of the memory and graphics controllers are integrated within the processor 130 (as described herein), the memory 158 and the coprocessor 160 are coupled to (e.g., directly to) the processor 130A, and the controller hub 152 in a single chip with the IOH 156.

The optional nature of an additional processor 130B is denoted in FIG. 5 with broken lines. Each processor 130A, 130B may include one or more of the processor cores 54 described herein and may be some version of the processor 130.

The memory 158 may be, for example, dynamic random-access memory (DRAM), phase change memory (PCM), or a combination thereof. For at least one embodiment, the controller hub 152 communicates with the processor(s) 130A, 130B via a multi-drop bus, such as a frontside bus (FSB), point-to-point interface such as QuickPath Interconnect (QPI), or similar connection 162.

In one embodiment, the coprocessor 160 is a special-purpose processor, such as, for example, a high-throughput MIC processor, a network or communication processor, a compression engine, a graphics processor, a GPGPU, an embedded processor, or the like. In an embodiment, the controller hub 152 may include an integrated graphics accelerator.

There can be a variety of differences between the physical resources of the processors 130A, 130B in terms of a spectrum of metrics of merit including architectural, micro-architectural, thermal, power consumption characteristics, and the like.

In some embodiments, the processor 130A executes instructions that control data processing operations of a general type. Embedded within the instructions may be coprocessor instructions. The processor 130A recognizes these coprocessor instructions as being of a type that should be executed by the attached coprocessor 160. Accordingly, the processor 130A issues these coprocessor instructions (or control signals representing coprocessor instructions) on a coprocessor bus or other interconnect, to the coprocessor 160. The coprocessor 160 accepts and executes the received coprocessor instructions.

Figure 6:
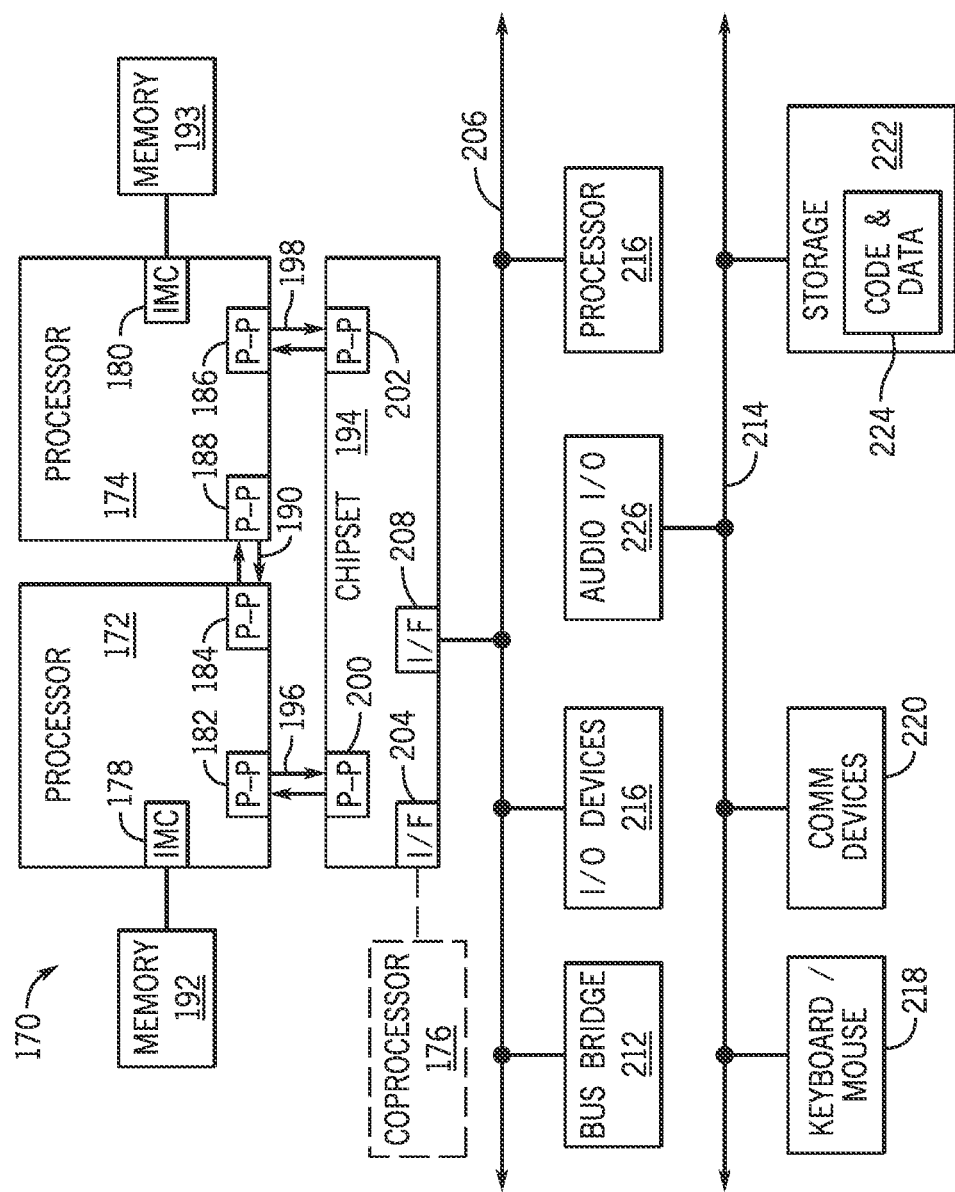
FIG. 6 is a block diagram of a first more specific exemplary system, in accordance with an embodiment of the present disclosure.

Referring now to FIG. 6, shown is a more detailed block diagram of a multiprocessor system 170 in accordance with an embodiment of the present disclosure. As shown in FIG. 6, the multiprocessor system 170 is a point-to-point interconnect system, and includes a processor 172 and a processor 174 coupled via a point-to-point interface 190. Each of processors 172 and 174 may be some version of the processor 130. In one embodiment of the disclosure, processors 172 and 174 are respectively processors 130A and 130B, while coprocessor 176 is coprocessor 160. In another embodiment, processors 172 and 174 are respectively processor 130A and coprocessor 160.

Processors 172 and 174 are shown including integrated memory controller (IMC) units 178 and 180, respectively. The processor 172 also includes point-to-point (P-P) interfaces 182 and 184 as part of its bus controller units. Similarly, the processor 174 includes P-P interfaces 186 and 188. The processors 172, 174 may exchange information via a point-to-point interface 190 using P-P interfaces 184, 188. As shown in FIG. 6, IMCs 178 and 180 couple the processors to respective memories, namely a memory 192 and a memory 193 that may be different portions of main memory locally attached to the respective processors 172, 174.

Processors 172, 174 may each exchange information with a chipset 194 via individual P-P interfaces 196, 198 using point-to-point interfaces 182, 200, 186, 202. Chipset 194 may optionally exchange information with the coprocessor 176 via a high-performance interface 204. In an embodiment, the coprocessor 176 is a special-purpose processor, such as, for example, a high-throughput MIC processor, a network or communication processor, a compression engine, a graphics processor, a GPGPU, an embedded processor, or the like.

A shared cache (not shown) may be included in either processor 172 or 174 or outside of both processors 172 or 174 that is connected with the processors 172, 174 via respective P-P interconnects such that either or both processors' local cache information may be stored in the shared cache if a respective processor is placed into a low power mode.

The chipset 194 may be coupled to a first bus 206 via an interface 208. In an embodiment, the first bus 206 may be a Peripheral Component Interconnect (PCI) bus or a bus such as a PCI Express bus or another third generation I/O interconnect bus, although the scope of the present disclosure is not so limited.

As shown in FIG. 6, various I/O devices 210 may be coupled to first bus 206, along with a bus bridge 212 that couples the first bus 206 to a second bus 214. In an embodiment, one or more additional processor(s) 216, such as coprocessors, high-throughput MIC processors, GPGPUs, accelerators (such as, e.g., graphics accelerators or digital signal processing (DSP) units), field programmable gate arrays, or any other processors, are coupled to the first bus 206. In an embodiment, the second bus 214 may be a low pin count (LPC) bus. Various devices may be coupled to the second bus 214 including, for example, a keyboard and/or mouse 218, communication devices 220 and a storage unit 222 such as a disk drive or other mass storage device which may include instructions/code and data 224, in an embodiment. Further, an audio I/O 226 may be coupled to the second bus 214. Note that other architectures may be deployed for the multiprocessor system 170. For example, instead of the point-to-point architecture of FIG. 6, the multiprocessor system 170 may implement a multi-drop bus or other such architectures.

Figure 7:
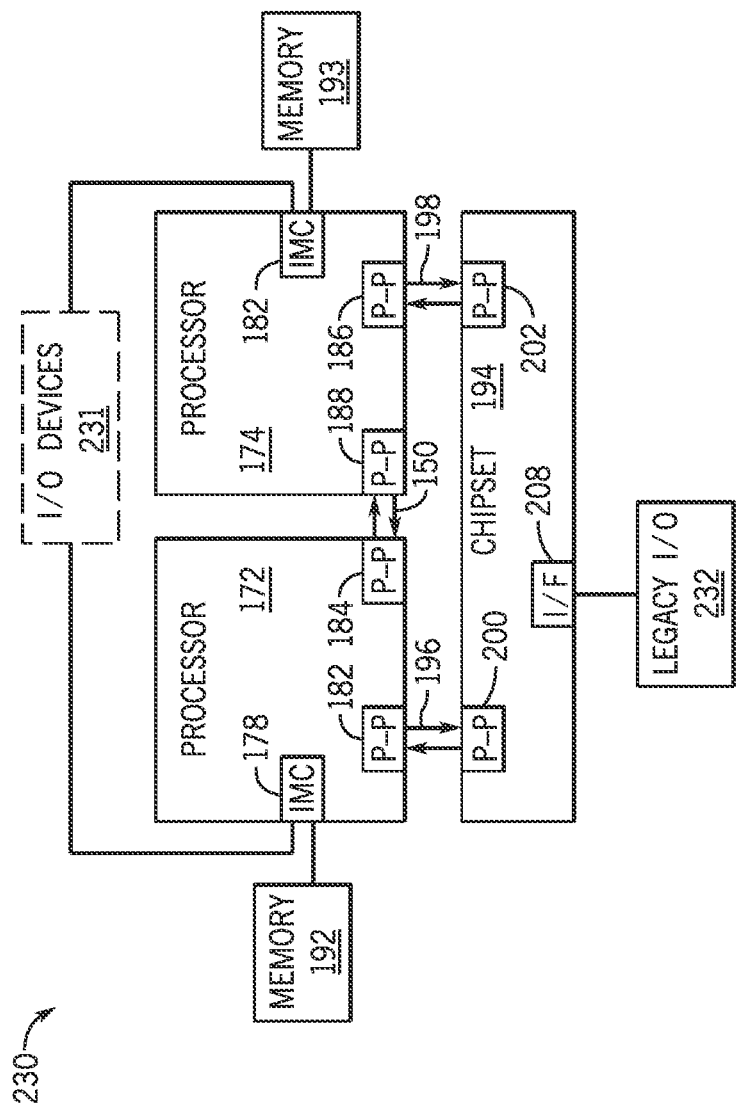
FIG. 7 is a block diagram of a second more specific exemplary system, in accordance with an embodiment of the present disclosure.

Referring now to FIG. 7, shown is a block diagram of a system 230 in accordance with an embodiment of the present disclosure. Like elements in FIGS. 7 and 8 contain like reference numerals, and certain aspects of FIG. 6 have been omitted from FIG. 7 to avoid obscuring other aspects of FIG. 7.

FIG. 7 illustrates that the processors 172, 174 may include integrated memory and I/O control logic ("IMC") 178 and 180, respectively. Thus, the IMC 178, 180 include integrated memory controller units and include I/O control logic. FIG. 7 illustrates that not only are the memories 192, 193 coupled to the IMC 178, 180, but also that I/O devices 231 are also coupled to the IMC 178, 180. Legacy I/O devices 232 are coupled to the chipset 194 via the interface 208.

Figure 8:
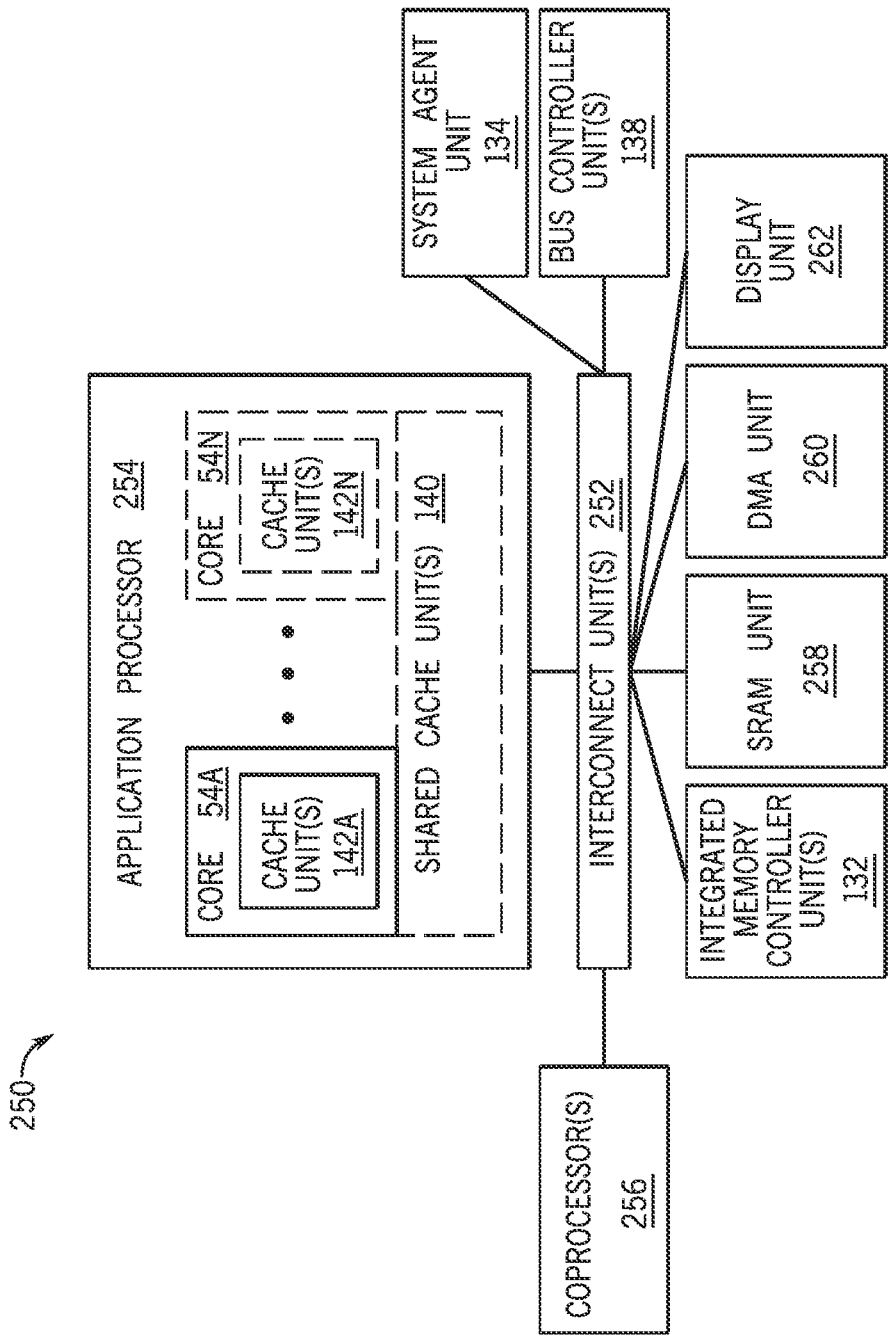
FIG. 8 is a block diagram of a system on a chip (SoC), in accordance with an embodiment of the present disclosure.

Referring now to FIG. 8, shown is a block diagram of a SoC 250 in accordance with an embodiment of the present disclosure. Similar elements in FIG. 4 have like reference numerals. Also, dashed lined boxes are optional features included in some SoCs 250. In FIG. 8, an interconnect unit(s) 252 is coupled to: an application processor 254 that includes a set of one or more cores 54A-N that includes cache units 142A-N, and shared cache unit(s) 140; a system agent unit 134; a bus controller unit(s) 138; an integrated memory controller unit(s) 132; a set or one or more coprocessors 256 that may include integrated graphics logic, an image processor, an audio processor, and/or a video processor; a static random access memory (SRAM) unit 258; a direct memory access (DMA) unit 260; and a display unit 262 to couple to one or more external displays. In an embodiment, the coprocessor(s) 256 include a special-purpose processor, such as, for example, a network or communication processor, a compression engine, a GPGPU, a high-throughput MIC processor, an embedded processor, or the like.

Embodiments of the mechanisms disclosed herein may be implemented in hardware, software, firmware, or a combination of such implementation approaches. Embodiments of the disclosure may be implemented as computer programs and/or program code executing on programmable systems including at least one processor, a storage system (including volatile and non-volatile memory and/or storage elements), at least one input device, and at least one output device.

Program code, such as data 224 illustrated in FIG. 6, may be applied to input instructions to perform the functions described herein and generate output information. The output information may be applied to one or more output devices. For purposes of this application, a processing system includes any system that has a processor, such as, for example, a digital signal processor (DSP), a microcontroller, an application-specific integrated circuit (ASIC), or a microprocessor.

The program code may be implemented in a high-level procedural or object-oriented programming language to communicate with a processing system. The program code may also be implemented in an assembly language or in a machine language. In fact, the mechanisms described herein are not limited in scope to any particular programming language. In any case, the language may be a compiled language or an interpreted language.

One or more aspects of at least one embodiment may be implemented by representative instructions stored on a machine-readable medium that represents various logic within the processor that, when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic cards, optical cards, or any other type of media suitable for storing electronic instructions.

Accordingly, embodiments of the embodiment include non-transitory, tangible machine-readable media containing instructions or containing design data, such as designs in Hardware Description Language (HDL) that may define structures, circuits, apparatuses, processors and/or system features described herein. Such embodiments may also be referred to as program products.

DMA Operations

In some cases, a memory architecture may provide support for any number of direct memory access (DMA) operations at least partially independent of the CPU coupled to the memory. DMA operations may involve data movement between two or more memory locations and may involve minor computations. The DMA operations may include a copy operation to copy any number of values from source memory to destination memory, an initialize operation to write values from a pipeline register to any number of addresses at the destination memory, a scatter operation to move values from a source memory buffer to any number of random locations provided by a list, a gather operation, to move values from any number of random locations pointed to by a list to a destination memory buffer, a broadcast operation to send one value from a pipeline register or any number of values from a source memory buffer to any number of random memory locations pointed to by a list, a reduce operation to reduce any number of values from random memory locations pointed to by a list to a single destination memory location, and so forth.

At least some DMA operations may include any number of atomic functions, and at least some of the atomic functions may include a corresponding return value. For example, an add atomic function may add a source value to a destination value and may store the sum in the destination memory, a bit-wise atomic function may apply a bit-wise operation between the source value(s) and the destination value(s), a max atomic function may store the greater of the source value(s) and the destination value(s) in the destination memory, a min atomic function may store the lesser of the source value(s) and the destination value(s) in the destination memory, a compare exchange atomic function may compare destination value(s) to a user-provided index value and may replace the destination value(s) with the source value(s) if the destination value(s) equal the user-provided index, an inverse compare exchange atomic function may compare destination value(s) to the user-provided index value and may replace the destination value(s) with the source value(s) if the destination value(s) do not equal the user-provided index, and so forth. The return values of the atomic functions may correspond to a previous value stored at the destination memory.

Figure 9:
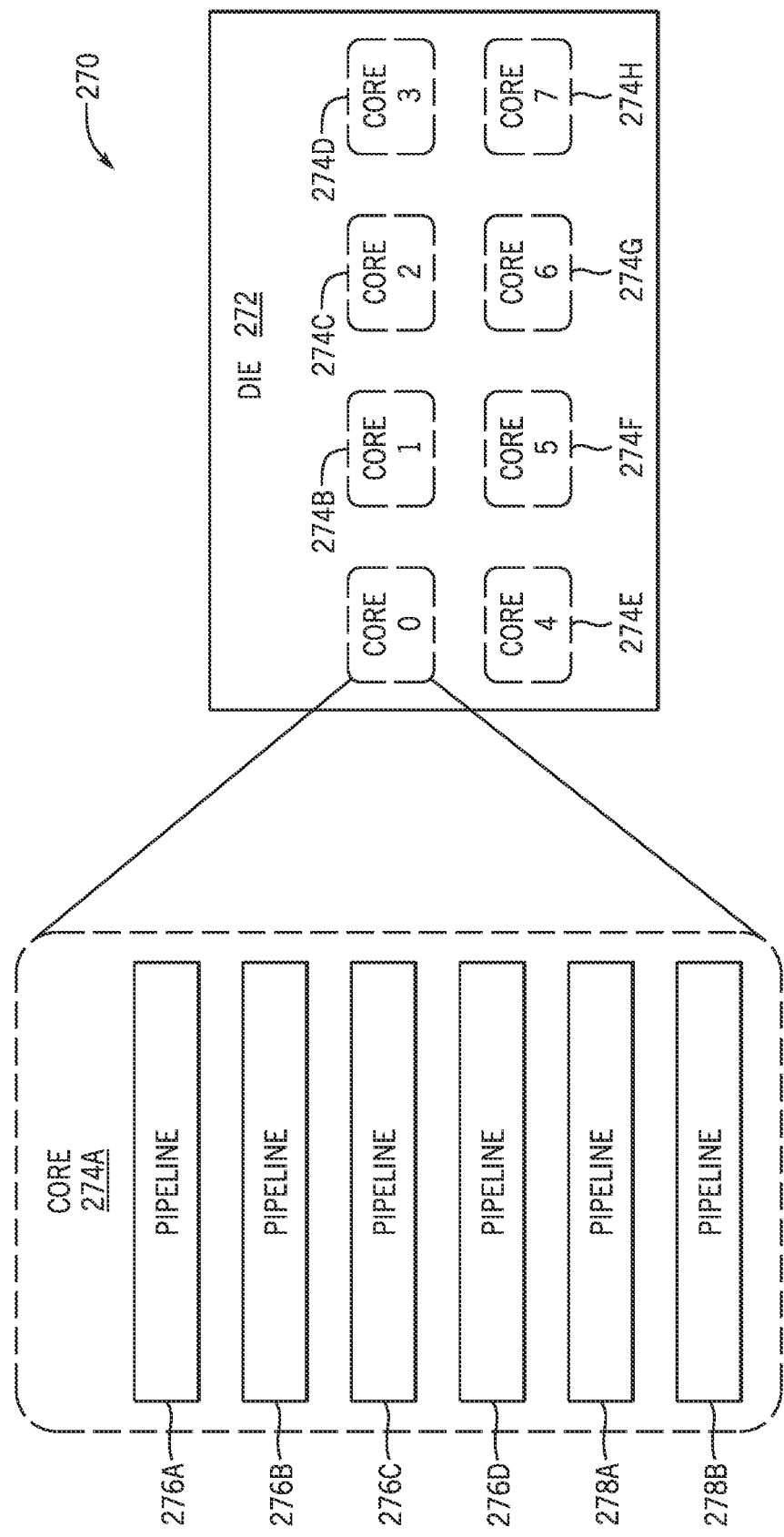
FIG. 9 is a block diagram of a memory architecture, in accordance with an embodiment of the present disclosure.

FIG. 9 is a block diagram of a memory architecture 270 including a die 272 having a number of processor cores, such as processor cores 274A, 274B, 274C, 274D, 274E, 274F, 274G, and 274H (collectively referred to herein as "processor cores 274A-H"). The cores 274A-H may be reduced instruction set computer (RISC) processors, such as programmable integrated unified memory (PIUMA) cores. The cores 274A-H may be single-threaded cores and/or multi-threaded cores. The processing cores 274A-H may be similarly constructed. For instance, the following discussing the processing core 274A may be applied to any and/or all cores. The processor core 274A may include local scratchpad static random access memory (SRAM) and a local dynamic random access memory (DRAM) channel. Additionally, the processor core 274A may include any number of multi-threaded pipelines, such as pipelines 290, 292, 294, 296 and any number of single threaded pipelines, such as pipelines 298, 300. In certain embodiments, the multi-threaded pipelines 290, 292, 294, 296 may include any number of threads (e.g., 2, 4, 8, 16, 32, and so forth). In the illustrated embodiment, the first processor core 274A includes four multi-threaded pipelines 290, 292, 294, 296 and two single threaded pipelines 298, 300. While four multi-threaded pipelines and two single threaded pipelines are shown, each processor core may contain more or less multi-threaded pipelines and/or single threaded pipelines. Each pipeline may include a DMA engine to facilitate DMA operations. For example, the DMA engine receives instructions corresponding to DMA operations and may issue memory requests for elements associated with DMA operations. Additionally or alternatively, the DMA engine may include an execution unit communicatively coupled to an interface of a target memory (e.g., SRAM, DRAM, and so forth) and the execution unit may execute atomic functions.

Return Value Storage

In order to provide support for return value storage, the instruction set architecture (ISA) for DMA operations may provide a programmer the ability to enable return value storage. In some instances, the register fields of the instruction associated with the DMA operation may include addresses for return value storage.

TABLE 1

DMA Scatter Operation

| Register Field | Description |
|---|---|
| $R_1$ | Address of Pointer List |
| $R_2$ | Address of Source Data Memory |
| $R_3$ | Destination count |
| $R_4$ | Number of data values to scatter |
| $R_5$ | Base address |
| DMA Type | See Table 3 |
| SIZE | Data Element Size (in bits) |

Table 1 depicts a number of register fields for an instruction associated with a DMA scatter operation without support for return value storage of atomic return values. The DMA scatter operation may send data values from a source data buffer to random destinations. The first register field, R1, may include a pointer list and/or an address list to determine scatter locations. In some embodiments, the pointer list may be a list of integers used as an offset or a relative address. For example, the fifth register field, R5, may include a base address and at least some of the integers in the pointer list may be summed with the base address to determine a corresponding absolute address. Additionally or alternatively, the pointer list may include a list of absolute addresses. The second register field, R2, may include base addresses of source data values to be scattered during the scatter operation. During the scatter operation, the source data values may be read out and stored at the destination memory.

The third register field, R3, may include a number of data values to be scattered during the DMA scatter operation. Additionally or alternatively, the third register field may include a destination count or a number of elements to be scattered for at least some entries in the scatter list. The fourth register field, R4, may include a number of data values to be scattered during the DMA scatter operation. The DMA type register field may provide an indication of an operation to be performed at the destination memory. The size register field may indicate a bit size (e.g., 8 bits, 16 bits, 32 bits, 64 bits, and so forth) for elements to be scattered.

TABLE 2

DMA Scatter Operation

| Register Field | Description |
| --- | --- |
| $R_1$ | Address of Pointer List |
| $R_2$ | Address of Source Data & Return Data Memory |
| $R_3$ | Number of data values to scatter; Destination count |
| $R_4$ | Compare value for compare-exchange function |
| $R_5$ | Base address |
| DMA Type | See Table 3 |
| SIZE | Data Element Size (in bits) |

With the foregoing in mind, Table 2 depicts a number of register fields for an instruction associated with a DMA scatter operation having support for return value storage of atomic return values. Implementing support for compare-exchange operations with return value storage may require modification of the register fields of the operation to provide addresses for return value storage and/or a source comparison value for an atomic compare-exchange operation. As seen by a comparison between Table 1 and Table 2, at least some of the register fields may be the same for the return value storage unsupported operation and the return value storage supported operation. For example, the first register field, the fifth register field, $R_5$, and the size register field may be the same. In certain embodiments, at least some of the register fields may differ between the return value storage unsupported operation and the return value storage supported operation. For example, the second register field, the third register field, the fourth register field, and the DMA type register field may be modified to allow a programmer to specify whether return value storage will be used as part of a DMA operation. The second register field, $R_2$, may include base addresses of source data values to be scattered during the scatter operation. During the scatter operation, the source data values may be read out and stored at the destination memory. The source data values at the source memory may then be overwritten by return values. As such, the DMA scatter operation may use the second register field as the base addresses for the source data values and may store the return values at the source memory using the base addresses. In certain embodiments, the DMA type register field may include a return value storage enable field, as discussed below. As such, the DMA type register field may enable storage of return values at the source memory.

Input arguments for the number of data values to be scattered and a destination count (e.g., a number of address to scatter data values at) may be combined into a single register field. For example, the third register field, $R_3$, may include a number of data values to be scattered during the DMA scatter operation. Additionally or alternatively, the third register field may include a destination count or a number of address to scatter data values at. The input arguments for the number of data values and the destination count may be allocated 32 bits each. The fourth register field, $R_4$, may include a compare value for a compare-exchange operation. For example, if the previous value at the destination memory is equal to the compare value, the corresponding source data value may be written into the destination memory. If the compare-exchange operation is not requested, then the fourth register field may be ignored.

TABLE 3

| BIT | DESCRIPTION |
| --- | --- |
| [0] | Address Form |
| [1] | Pack/Unpack bit for copystride. |
| [2] | Offset Pointer Size |
| [3] | Offset Pointer Type |
| [4] | Complement Incoming Value |
| [5] | Complement Existing Value |
| [6] | Return Previous Destination Memory Value to Buffer |
| [9:7] | Bitwise Operation Encoding |
| [11:10] | Operand Type |
| [14:12] | Operation to Perform at Destination |

Table 3 depicts the DMA type fields (e.g., bits) for a DMA instruction associated with a DMA operation. For example, the DMA type fields may include an address form field, a pack/unpack field, an offset pointer size field, a complement incoming value field, a complement existing value field, a return value storage enable field, a bitwise operation encoding field, an operand type field, an operation field, and so forth. The address form field (e.g., the first bit) may correspond to an address form for the DMA instruction. For example, if the first bit is set to 0, addresses may be stored in the base-offset form. Alternatively, if the first bit is set to 1, addresses may be stored in base address form. Implementing support for compare-exchange operations with return value storage may require modification of the DMA type fields of the operation to provide ability to enable/disable return value storage. A sixth DMA type field (e.g., a sixth bit) may correspond to a return value storage enable field for DMA operations supporting return value storage. For example, if the sixth bit is set to 1, return value storage may be enabled and previous values at the destination memory may be returned from the destination memory to a separate buffer. The sixth bit may be modified between a DMA operation with return value storage not supported and a DMA operation with return value storage supported. For example, the sixth bit may be allocated to the bitwise operation encoding field for DMA operations where return value storage is not supported.

Figure 10:
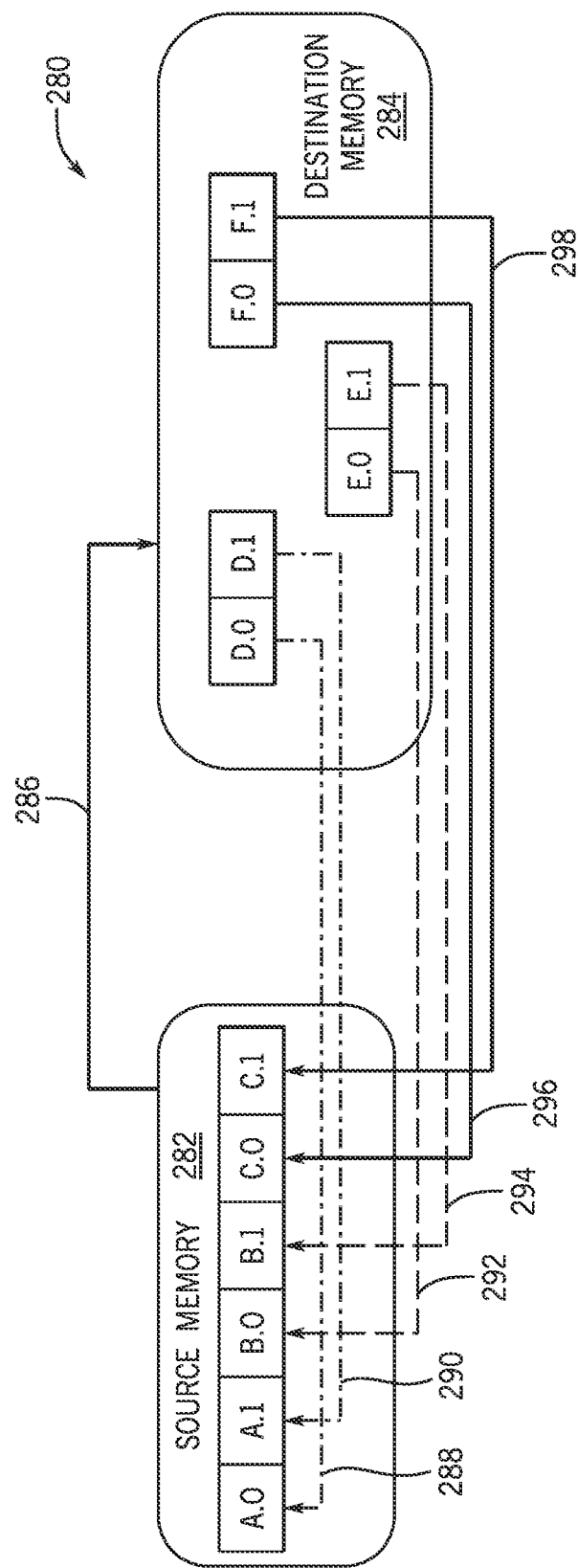
FIG. 10 is a block diagram of an embodiment of a direct memory access (DMA) scatter operation, in accordance with an embodiment of the present disclosure.

FIG. 10 is a block diagram of a DMA scatter operation 280, in accordance with an embodiment of the present disclosure. The DMA scatter operation 280 may include a compare exchange operation executed at destination locations and return values may be written back to a corresponding location at a source memory 282. A source memory 282 may include any number of source data elements at a corresponding number of source data addresses, such as source data addresses, A.0, A.1, B.0, B.1, C.0, C.1. The scatter instruction 286 may scatter source data values from the source memory 282 to a destination memory 284. The destination memory 284 may include a corresponding number of destination data addresses and a corresponding number of elements at at least some of the destination data addresses. For example, the scatter instruction 286 may scatter a first source data element at source address A.0 to destination address D.0., a second source data element at source address A.1 to destination address D.1, a third source data element at source address B.0 to destination address E.0, a fourth source data element at source address B.1 to destination address E.1, a fifth source data element at address C.0 to destination address F.0, a sixth source data element at address C.1 to destination address F.1, and so forth. In certain embodiments, the scatter instruction may include a compare exchange operation. For example, the scatter instructions 286 may execute the compare exchange operation between a previous destination data value at destination address D.0, and the compare value from the fourth register field and may return 288 the previous destination data value from destination address D.0 to source address A.0. Accordingly, the scatter instructions 286 may also perform compare exchange operations at destination addresses D.1, E.0, E.1, F.0, F.1. As such, the scatter instruction 286 may return 290 the previous destination data value from destination address D.1 to source address A.1, may return 292 the previous destination data value from destination address E.0 to source address B.0, may return 294 the previous destination data value from destination address E.1 to source address B.1, may return 296 the previous destination data value from destination address F.0 to source address C.0, and/or may return 298 the previous destination data value from destination address F.1 to source address C.1. The total number of elements in the source memory 282 may be equal to the destination count (in the third register field) multiplied by the number of elements at each destination location.

Figure 11:
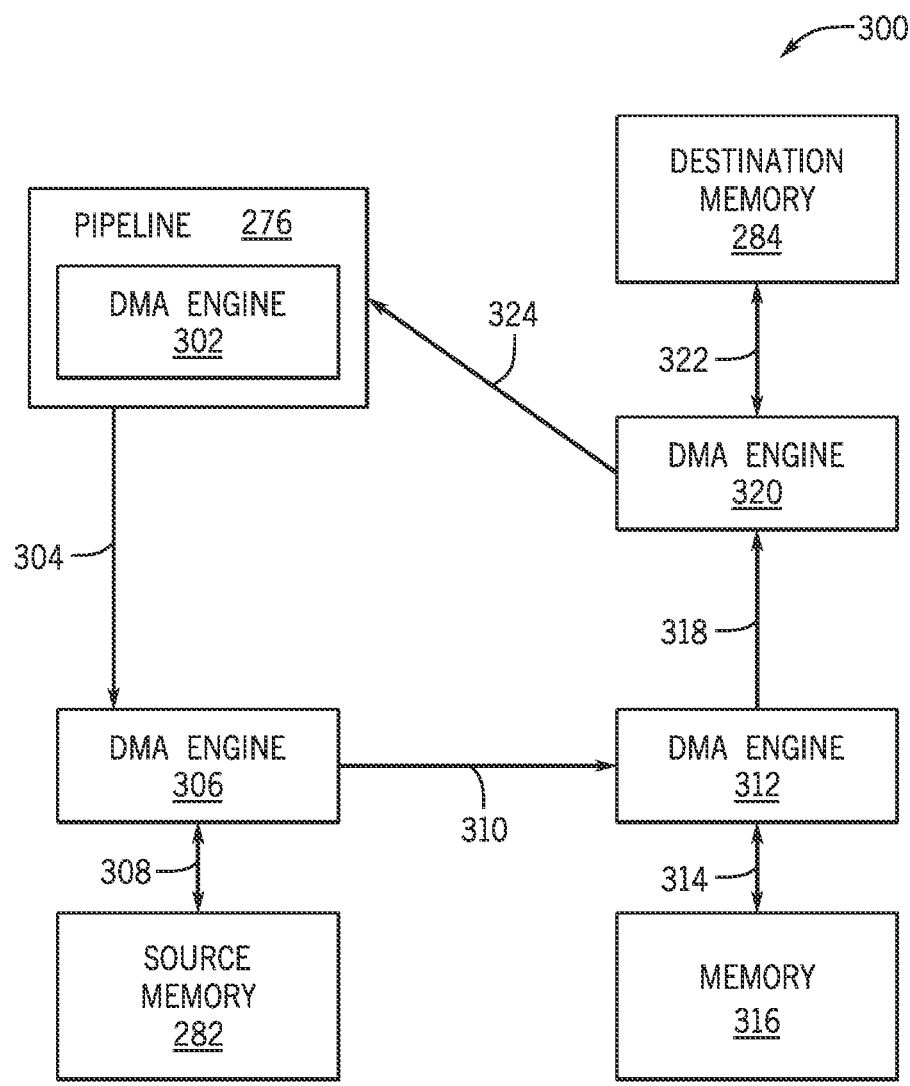
FIG. 11 is a block diagram of another embodiment of a DMA scatter operation not supporting return value storage, in accordance with an embodiment of the present disclosure.

With the foregoing in mind, FIG. 11 illustrates a block diagram of a DMA scatter operation 300 where return value storage is not supported. The pipeline 276 may include a DMA engine 302 that may receive instructions (e.g., scatter instruction 286) associated with the DMA scatter operation 300 and may generate and transmit requests for elements based on the instructions. The DMA engine 302 may transmit a request 304 (per element) to a second DMA engine 306 communicatively coupled to the source memory 282. The request 304 may instruct the second DMA engine 306 to retrieve a source data value 308 from the source memory 282. The second DMA engine 306 may send a request 310 to a third DMA engine 312. The request 310 may instruct the third DMA engine 312 to retrieve a pointer from a second memory 316. The request 310 may include the source data value. In certain embodiments, the third DMA engine 312 may dereference the pointer prior to sending the pointer location along to another DMA engine.

The third DMA engine 312 may send a request 318 to a fourth DMA engine 320 communicatively coupled to the destination memory 284. The request 318 may include the source data value and/or the pointer and the request 318 may instruct the fourth DMA engine 320 to perform an atomic add operation. The fourth DMA engine 320 may perform the atomic add operation 322. For example, the fourth DMA engine 320 may sum the source data value and a destination data value and may store the sum at the destination memory 284. The fourth DMA engine 320 may transmit an acknowledgment 324 to the first DMA engine 302. For example, the acknowledgment 324 may provide an indication that the sum of the source data values and destination data values are stored at the destination memory 284. After the first DMA engine 302 receives acknowledgments for at least some of the elements, the DMA scatter operation 300 may end.

Figure 12:
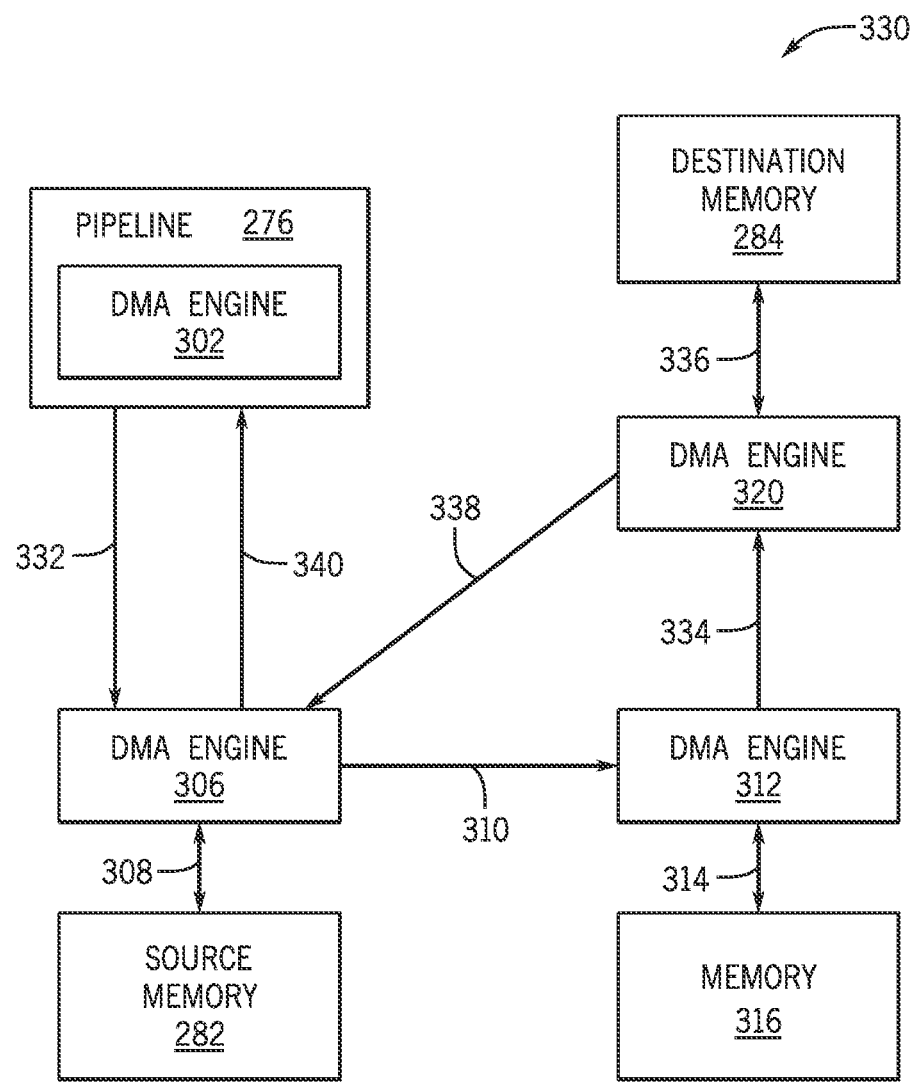
FIG. 12 is a block diagram of another embodiment of a DMA scatter operation supporting return value storage, in accordance with an embodiment of the present disclosure.

With the foregoing in mind, FIG. 12 illustrates a block diagram of an embodiment of a DMA scatter operation 330, in accordance with embodiments of the present disclosure. The pipeline 276 may include the DMA engine 302 that may receive instructions (e.g., scatter instruction 286) associated with the DMA scatter operation 330 and may generate and transmit requests for elements based on the instructions. The DMA engine 302 may transmit a request 332 (per element) to a second DMA engine 306 communicatively coupled to the source memory 282. The request 332 may instruct the second DMA engine 306 to retrieve the source data value 308 from the source memory 282. The second DMA engine 306 may send the request 310 to the third DMA engine 312. The request 310 may instruct the third DMA engine 312 to retrieve a pointer from a second memory 316. The request 310 may include the source data value. In certain embodiments, the third DMA engine 312 may dereference the pointer prior to sending the pointer location along to another DMA engine.

The third DMA engine 312 may send a request 334 to a fourth DMA engine 320 communicatively coupled to the destination memory 284. The request 334 may include the source data value and/or the pointer and the request 334 may instruct the fourth DMA engine 320 to perform an atomic compare exchange operation. In some embodiments, the request 334 may indicate the source to send return values of the atomic compare exchange operation. For example, the request 334 may instruct the fourth DMA engine 320 to send the return data values to the second DMA engine 306 to store the return data values at the source memory 282. The fourth DMA engine 320 may perform the atomic compare exchange operation 336 on data values at the destination memory 284 and may transmit 338 the data values as return data values to the second DMA engine 306. The second DMA engine 306 may store the return data values in the source memory 282 and may transmit an acknowledgement 340 to the first DMA engine 302. For example, the acknowledgement 340 may provide an indication that the return data values are stored at the source memory 282. While a DMA scatter operation is described above, additional DMA operations, such as a DMA initialization operation and/or a DMA copy operation, may be executed using the techniques described above for return value storage. The specification of the source memory may vary depending on the instruction and may be based on available input argument space and/or applicability to the DMA operation. For example, for an initialization operation, the source data value may include a single 8-byte value from a register. Accordingly, if return values from atomic operations at all destination addresses are requested, then an additional address for the source memory may be included in the instruction request. As another example, a copy operation may include additional register space and the return value address and compare-exchange value may both be provided as inputs.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. For instance, any number of atomic operations may be executed and associated return data values may be stored.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS

EXAMPLE EMBODIMENT 1. A system comprising: a first direct memory access (DMA) engine configured to request a DMA operation, wherein the DMA operation comprises an atomic operation and a second DMA engine configured to receive a return value associated with the atomic operation, store the return value at a source memory associated with the second DMA engine, and send an acknowledgment to the first DMA engine in response to storing the return value.

EXAMPLE EMBODIMENT 2. The system of example embodiment 1, comprising a third DMA engine configured to receive the request and configured to perform the atomic operation.

EXAMPLE EMBODIMENT 3. The system of example embodiment 2, wherein the atomic operation comprises a compare-exchange operation.

EXAMPLE EMBODIMENT 4. The system of example embodiment 2, wherein the third DMA engine is configured to:
retrieve the return value from a destination memory associated with the third DMA engine; and
send the return value to the second DMA engine.

EXAMPLE EMBODIMENT 5. The system of example embodiment 1, wherein the first DMA engine is configured to receive an instruction associated with the DMA operation comprising a first register field indicative of a number of data elements associated with a destination memory.

EXAMPLE EMBODIMENT 6. The system of example embodiment 5, wherein the number of data elements associated with the destination memory is based on a number of locations associated with the destination memory and a corresponding number of elements associated with at least one location.

EXAMPLE EMBODIMENT 7. The system of example embodiment 5, wherein the instruction comprises a third register field indicative of a return value storage enable field.

EXAMPLE EMBODIMENT 8. The system of example embodiment 1, wherein the request comprises a request to load the source value from the second DMA engine, a request to load a pointer from a third DMA engine, or a combination thereof.

EXAMPLE EMBODIMENT 9. The system of example embodiment 1, wherein the first DMA engine is configured to receive an instruction associated with the DMA operation, wherein the instruction comprises a plurality of register fields.

EXAMPLE EMBODIMENT 10. The system of example embodiment 9, wherein the plurality of register fields comprises a first register field, wherein the first register field is indicative of a plurality of base addresses corresponding to a plurality of source values and a plurality of return values.

EXAMPLE EMBODIMENT 11. The system of example embodiment 9, wherein the plurality of register fields comprises a second register field, wherein the second register field comprises a compare value associated with the atomic operation.

EXAMPLE EMBODIMENT 12. The system of example embodiment 11, comprising a third DMA engine configured to compare the return value with the compare value.

EXAMPLE EMBODIMENT 13. The system of example embodiment 9, wherein the plurality of register fields comprises a third register field, wherein the third register field is indicative of a number of elements associated with the DMA operation and a destination count associated with the DMA operation.

EXAMPLE EMBODIMENT 14. The system of example embodiment 13, wherein the second DMA engine is configured to retrieve a number of source values from the source memory, the number of source values corresponding to the number of elements.

EXAMPLE EMBODIMENT 15. A method comprising:
receiving, from a first direct memory access (DMA) engine at second DMA engine, a request to perform a direct memory access (DMA) operation, the DMA operation comprising an atomic operation;
obtaining a source value from a source memory via the second DMA engine;
performing the atomic operation in a destination memory using a third DMA engine;
storing the source value in the destination memory using the third DMA engine;
retrieving, from the destination memory using the third DMA engine, a return value associated with the atomic operation; and
sending, from the third DMA engine to the second DMA engine, the return value for storage in the source memory.

EXAMPLE EMBODIMENT 16. The method of example embodiment 15, comprising storing the return value at a previous location of the source value at the source memory.

EXAMPLE EMBODIMENT 17. The method of example embodiment 16, comprising receiving an instruction associated with the DMA operation, wherein the instruction comprises a first register field indicative of the previous location of the source value.

EXAMPLE EMBODIMENT 18. The method of example embodiment 17, wherein the instruction comprises a second register field indicative of a compare value associated with the atomic operation.

EXAMPLE EMBODIMENT 19. The method of example embodiment 15 comprising:
receiving a plurality of source values from the source memory, wherein the plurality of source values comprises the source value; and
storing the plurality of source values at a plurality of random locations at the destination memory.

EXAMPLE EMBODIMENT 20. A system comprising:
a first direct memory access (DMA) engine configured to request a DMA operation, wherein the DMA operation comprises an atomic operation;
a second DMA engine configured to retrieve a source value from a location of a source memory associated with the second DMA engine; and
a third DMA engine configured to:
perform the atomic operation;
retrieve a return value associated with the atomic operation;
store the source value at a destination memory associated with the third DMA engine; and
send the return value to the second DMA engine using an address specified in a register field of the request, wherein the second DMA engine is configured to store the return value at the location of the source memory.

What is claimed is:
1. A system comprising:
a first direct memory access (DMA) engine configured to request a DMA operation, wherein the DMA operation comprises an atomic operation; and a second DMA engine configured to:
    receive a return value associated with the atomic operation;
    store the return value at a source memory associated with the second DMA engine; and
    send an acknowledgement to the first DMA engine in response to storing the return value.

2. The system of claim 1, comprising a third DMA engine configured to receive the request and configured to perform the atomic operation.

3. The system of claim 2, wherein the atomic operation comprises a compare-exchange operation.

4. The system of claim 2, wherein the third DMA engine is configured to:
    retrieve the return value from a destination memory associated with the third DMA engine; and
    send the return value to the second DMA engine.

5. The system of claim 1, wherein the first DMA engine is configured to receive an instruction associated with the DMA operation comprising a first register field indicative of a number of data elements associated with a destination memory.

6. The system of claim 5, wherein the number of data elements associated with the destination memory is based on a number of locations associated with the destination memory and a corresponding number of elements associated with at least one location.

7. The system of claim 5, wherein the instruction comprises a third register field indicative of a return value storage enable field.

8. The system of claim 1, wherein the request comprises a request to load the source value from the second DMA engine, a request to load a pointer from a third DMA engine, or a combination thereof.

9. The system of claim 1, wherein the first DMA engine is configured to receive an instruction associated with the DMA operation, wherein the instruction comprises a plurality of register fields.

10. The system of claim 9, wherein the plurality of register fields comprises a first register field, wherein the first register field is indicative of a plurality of base addresses corresponding to a plurality of source values and a plurality of return values.

11. The system of claim 9, wherein the plurality of register fields comprises a second register field, wherein the second register field comprises a compare value associated with the atomic operation.

12. The system of claim 11, comprising a third DMA engine configured to compare the return value with the compare value.

13. The system of claim 9, wherein the plurality of register fields comprises a third register field, wherein the third register field is indicative of a number of elements associated with the DMA operation and a destination count associated with the DMA operation.

14. The system of claim 13, wherein the second DMA engine is configured to retrieve a number of source values from the source memory, the number of source values corresponding to the number of elements.

15. A method comprising:
    receiving, from a first direct memory access (DMA) engine at second DMA engine, a request to perform a direct memory access (DMA) operation, the DMA operation comprising an atomic operation;
    obtaining a source value from a source memory via the second DMA engine;
    performing the atomic operation in a destination memory using a third DMA engine;
    storing the source value in the destination memory using the third DMA engine;
    retrieving, from the destination memory using the third DMA engine, a return value associated with the atomic operation; and
    sending, from the third DMA engine to the second DMA engine, the return value for storage in the source memory.

16. The method of claim 15, comprising storing the return value at a previous location of the source value at the source memory.

17. The method of claim 16, comprising receiving an instruction associated with the DMA operation, wherein the instruction comprises a first register field indicative of the previous location of the source value.

18. The method of claim 17, wherein the instruction comprises a second register field indicative of a compare value associated with the atomic operation.

19. The method of claim 15 comprising:
    receiving a plurality of source values from the source memory, wherein the plurality of source values comprises the source value; and
    storing the plurality of source values at a plurality of random locations at the destination memory.

20. A system comprising:
    a first direct memory access (DMA) engine configured to request a DMA operation, wherein the DMA operation comprises an atomic operation;
    a second DMA engine configured to retrieve a source value from a location of a source memory associated with the second DMA engine; and
    a third DMA engine configured to:
        perform the atomic operation;
        retrieve a return value associated with the atomic operation;
        store the source value at a destination memory associated with the third DMA engine; and
        send the return value to the second DMA engine using an address specified in a register field of the request, wherein the second DMA engine is configured to store the return value at the location of the source memory.

* * * * *